US012392459B2

(12) United States Patent
Kaye et al.

(10) Patent No.: US 12,392,459 B2
(45) Date of Patent: Aug. 19, 2025

(54) DUAL POWER LIGHT SOURCE

(71) Applicant: LB Marketing, Inc., Alpharetta, GA (US)

(72) Inventors: Douglas Kaye, Alpharetta, GA (US); Kelly Hires, Alpharetta, GA (US); Hamida Tanha, Tucker, GA (US); Lauren Lindley, Atlanta, GA (US); Kaif Dosani, Lawrenceville, GA (US)

(73) Assignee: LB Marketing, Inc., Alpharetta, GA (US)

( * ) Notice: Subject to any disclaimer, the term of this patent is extended or adjusted under 35 U.S.C. 154(b) by 0 days.

(21) Appl. No.: 18/915,668

(22) Filed: Oct. 15, 2024

(65) Prior Publication Data

US 2025/0035272 A1 Jan. 30, 2025

Related U.S. Application Data

(63) Continuation of application No. 18/130,024, filed on Apr. 3, 2023, now Pat. No. 12,146,624.

(60) Provisional application No. 63/328,940, filed on Apr. 8, 2022.

(51) Int. Cl.
*F21L 4/08* (2006.01)
*F21L 4/00* (2006.01)
*F21V 23/04* (2006.01)

(52) U.S. Cl.
CPC ............... *F21L 4/085* (2013.01); *F21L 4/005* (2013.01); *F21V 23/04* (2013.01)

(58) Field of Classification Search
CPC ................................ F21L 4/005; F21L 4/0085
See application file for complete search history.

(56) References Cited

U.S. PATENT DOCUMENTS

| | | | | |
|---|---|---|---|---|
| 6,616,296 | B1 * | 9/2003 | Roux | F21V 19/047 362/208 |
| 12,146,624 | B2 * | 11/2024 | Kaye | F21V 23/04 |
| 2003/0206410 | A1 * | 11/2003 | Parsons | F21L 4/08 362/183 |
| 2005/0225969 | A1 * | 10/2005 | Chen | F21L 4/085 362/157 |
| 2009/0154148 | A1 * | 6/2009 | Meyer | F21S 6/005 315/86 |
| 2013/0343042 | A1 * | 12/2013 | Windom | F21L 4/005 362/183 |
| 2018/0128461 | A1 * | 5/2018 | Le | F21L 4/08 |
| 2023/0324015 | A1 * | 10/2023 | Kaye | F21L 4/005 |
| 2025/0035272 | A1 * | 1/2025 | Kaye | F21V 23/0414 |

FOREIGN PATENT DOCUMENTS

| | | | | |
|---|---|---|---|---|
| WO | WO-2013169233 A1 * | 11/2013 | | F21L 4/005 |
| WO | WO-2018057705 A1 * | 3/2018 | | |

* cited by examiner

*Primary Examiner* — Alexander K Garlen
(74) *Attorney, Agent, or Firm* — Perilla Knox & Hildebrandt LLP; Jonathan A. Paulis

(57) ABSTRACT

Various embodiments of dual-powered lighting devices are described. In some examples, the device includes a light source, a first power source, a second power source, and one or more switching devices. The switching device switches between the first power source and the second power source to power the light source.

19 Claims, 6 Drawing Sheets

DUAL POWER LIGHT SOURCE

CROSS-REFERENCE TO RELATED APPLICATION

This application is a continuation of U.S. patent application Ser. No. 18/130,024, entitled, "DUAL POWER LIGHT SOURCE," filed Apr. 3, 2023, which claims the benefit of and priority to U.S. Provisional Patent Application No. 63/328,940, entitled "DUAL POWER LIGHT SOURCE," filed Apr. 8, 2022, the contents of which are hereby incorporated herein by reference in its entirety.

BACKGROUND

Several forms of handheld lighting sources exist. For instance, a flashlight or handheld lamp can provide handheld convenience in a wide variety of environments. A flashlight can refer to a portable handheld electric light source. The light source can include an incandescent light bulb, one or more light-emitting diodes (LEDs), and other types of light sources. Handheld and portable light sources can use a portable power source.

FIELD OF THE INVENTION

The present invention relates to a portable lighting device. More specifically, the present invention relates to a flashlight or another light source having multiple power sources.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present invention relates to a dual power light source device. More specifically, the present invention relates to a flashlight, lantern, or another light source having multiple power sources. Generally, the dual power light source can include first and second power sources for powering the light source. In one example embodiment, the first power source is a rechargeable battery and the second power source is one or more alkaline or other non-rechargeable batteries. A user operating the light source can switch between the first and second power sources to select the desired power source or can use both power sources.

In some example embodiments, the rechargeable battery is built into the light source, and the alkaline batteries are removable and replaceable by a user. In some example embodiments, the dual power light source can include a dual power battery cartridge that holds and provides two different types of power sources. For example, the dual power battery cartridge can hold a first power source, such as rechargeable batteries, in a permanently or semi permanently sealed portion; the dual power battery cartridge can hold a second power source, such as non-rechargeable batteries, in an open or unsealed portion of the dual power battery cartridge. The dual power battery cartridge can provide separate power outputs for the two different power sources.

Figure 1:
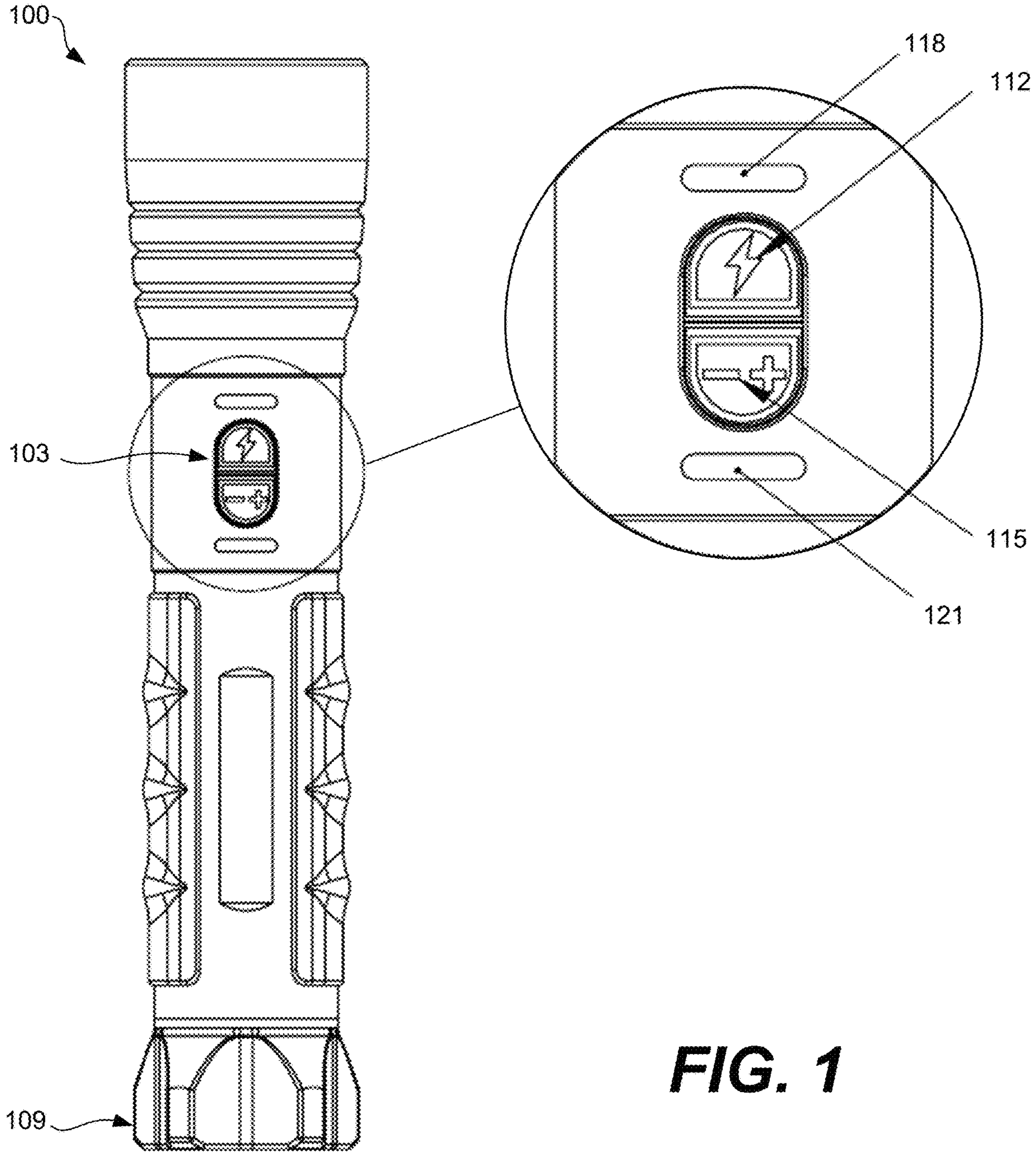
FIG. 1 is a drawing that includes a side view of a dual power light device and a detail view of an example dual power selector, in accordance with various embodiments of the present disclosure.

FIG. 1 shows a side view of the dual power light device 100 and a detail view of an example dual power selector 103. The dual power light device 100 can also include a detachable base cap 109 that enables servicing the dual power sources of the device.

The dual power selector 103 of the dual power light device 100 can provide a user with the ability to select between two or more power sources. The power sources of the dual power light device 100 can include an alkaline, replaceable, or non-rechargeable power source, as well as a rechargeable power source.

The dual power selector 103 can provide one or more button, slider, toggle, or other types of physical selection components that a user can interact with to select between two or more power sources, and otherwise control modes of the dual power light device 100. The dual power selector 103 can include two power selector components or buttons. In other examples, the dual power selector 103 can include a mechanism that physically moves to mechanically engage contacts that select between two or more power sources.

In some examples, the power selectors can include a rechargeable power selection component 112, and an alkaline or replaceable power selection component 115. The two power selectors of the dual power selector 103 can be provided using an integrated two-part external button such as a rocker or membrane, or alternatively using two separate physical buttons. In some examples, the underlying electronics include two different switches or a multi-pole switch, among other options.

The dual power selector 103 can also provide one or more light or illuminated indicators that provide a power selection status. The power selection status can indicate which power source is selected and in use for the dual power light device 100. In this example, the dual power selector 103 shows a separate power status indicator for each power source of the device. In other examples, a single power status indicator can change a color, a hue, a pattern, icon, cutout, or another feature in order to indicate the selected power source.

The power status indicator or indicators can also show a charge level or power level for the associated power source or sources. In some examples, the power level is only shown for the selected power source. The power status indicator or indicators can also indicate whether the power source is low below a threshold value, whether the power source is fully charged or charged over a threshold value, whether the power source is charging, and so on.

A specific charge level can also be provided. The specific charge level can refer to a fraction or percentage of the total. The charge levels, power type selection, and other information discussed for the power status indicator or indicators can be shown as a number of lights, a length (distance) of light illumination across a bar, a status light color, a predetermined light flashing and/or an intensity fluctuation pattern, and so on.

For example, a first status light color, a predetermined light flashing and/or intensity fluctuation pattern can indicate a low power level that has crossed a predetermined threshold voltage or another threshold value. A second status light color, predetermined light flashing and/or an intensity fluctuation pattern can indicate a high or fully charged power level that has crossed a predetermined threshold value. A third status light color, predetermined light flashing and/or an intensity fluctuation pattern can indicate that the power source is charging. Generally, a status indicator can provide a number of charge statuses for a power source, such as charging, charged, low, and so on. A non-rechargeable power source will not utilize the "charging" indication of the status indicator, since the non-rechargeable power source will not be charging within the device.

The status indicators shown include a rechargeable power indicator 118 and an alkaline or replaceable power indicator 121. The rechargeable power indicator 118 can provide an illuminated or non-illuminated indication that the rechargeable power source has been selected and is in use. The replaceable power indicator 121 can provide an illuminated or non-illuminated indication that the replaceable power source has been selected and is in use.

The dual power selector 103, such as the rechargeable power selection component 112 and the replaceable power selection component 115, can also be used to select a lighting mode of a primary light source of the dual power light device 100. In various modes for a selected power source, the light source can be set to flash, pulsate, or strobe; can be set to provide a constant light source typical to a flashlight; can be set to a particular color; can be set to continuously or periodically change colors; can be set to various luminous intensities, and other operations as can be appreciated. The illuminated status indicators can indicate the selected mode, in some embodiments.

Figure 2:
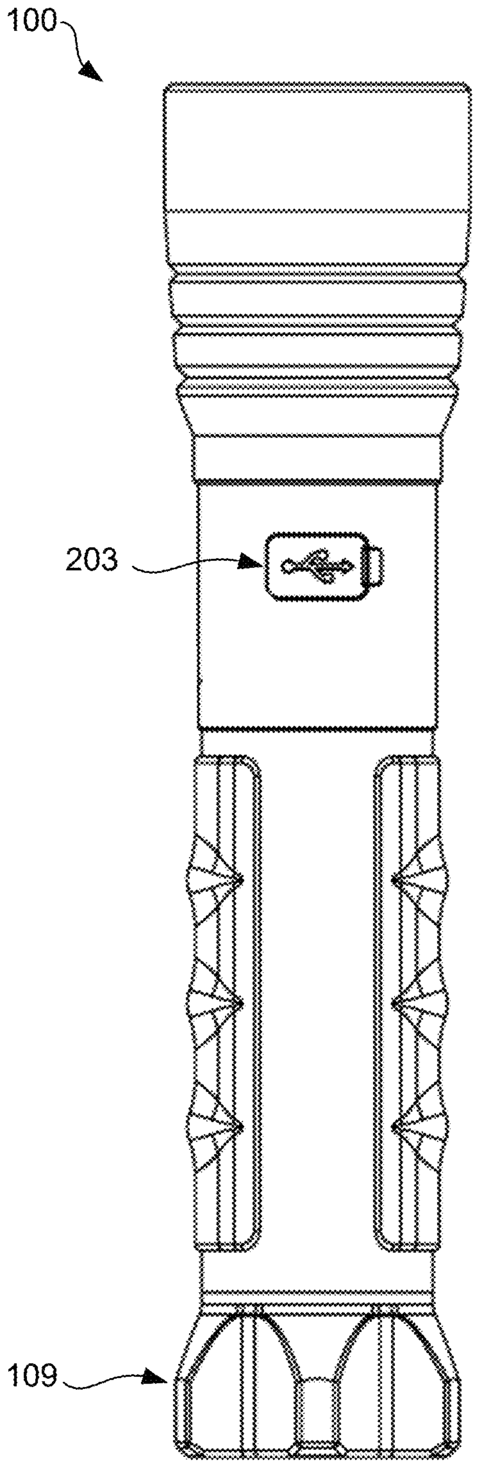
FIG. 2 is a drawing that includes another side view of a dual power light device, in accordance with various embodiments of the present disclosure.

FIG. 2 shows a side view of the dual power light device 100. This view shows an opposite side of the dual power light device 100 relative to FIG. 1. In this view, the base cap 109 can be seen at the bottom, and a charging port 203 can be seen on the handle.

While shown on the handle at a position close to the connection with the lighting head of the dual power light device 100, the charging port 203 can alternatively be located closer to the base cap 109. The charging port 203 can also be incorporated into the base cap 109 or the lighting head component. The charging port 203 can include a tab-like cover that can act as a dust protector. In some examples, the cover can also provide a waterproof or water resistant protection for the charging port 203. The cover can include a push-fit, snap-fit, a latch, or another closure mechanism.

The charging port 203 can charge a rechargeable power source such as a battery that is permanently installed within the body of the dual power light device 100, or a battery that is sealed within a dual power source cartridge of the dual power light device 100. An example of the dual power source cartridge is shown in FIGS. 3-6. In instances that include a rechargeable power source installed within the dual power light device 100, the replaceable, alkaline, or non-rechargeable power source can be directly inserted into the dual power light device 100, for example, into a hatch in the body once open, or into the bottom of the device once the base cap 109 is removed. However, the replaceable, alkaline, or non-rechargeable power source can also be inserted into a single-power-source cartridge.

Figure 3:
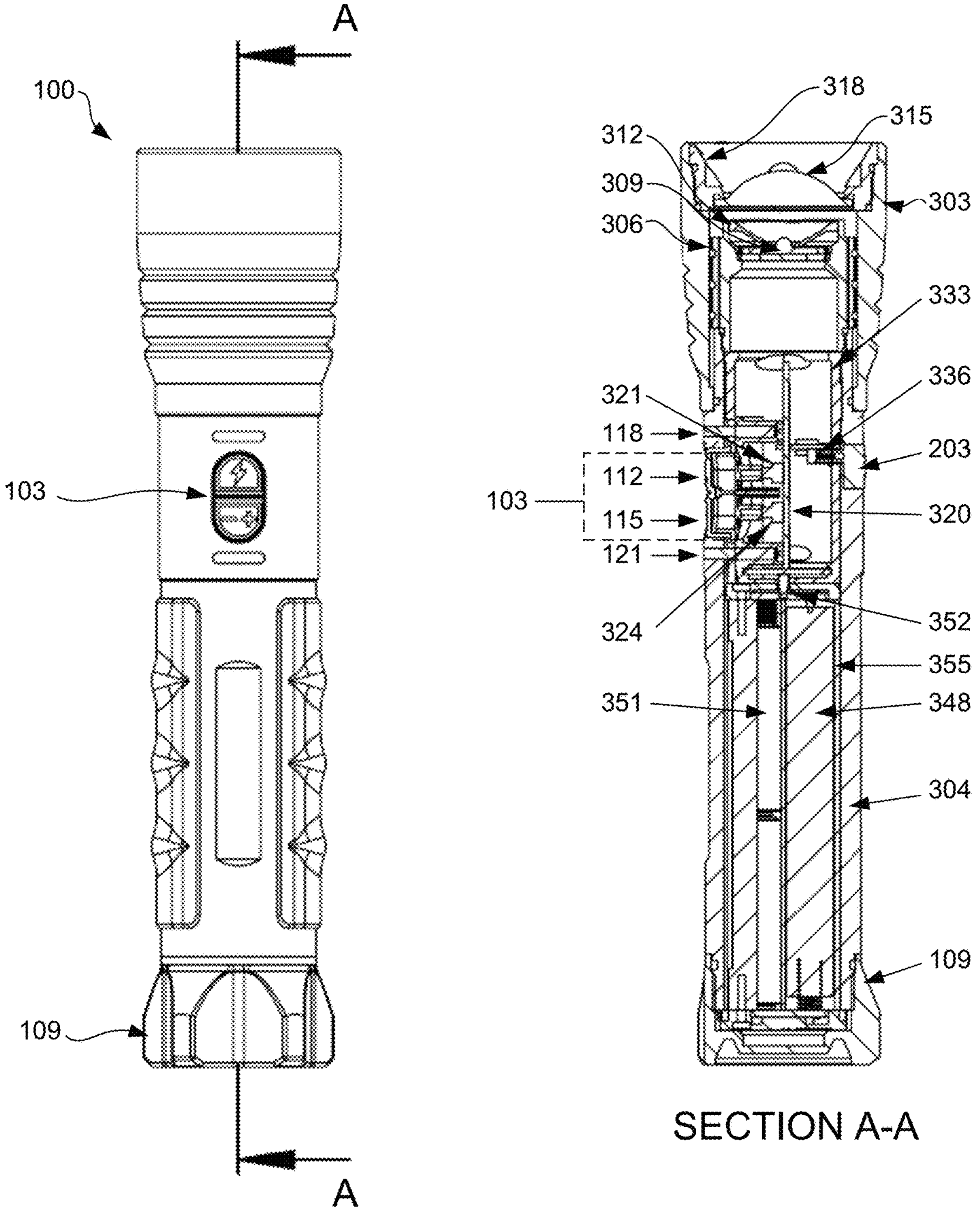
FIG. 3 is a drawing that includes another side view of a dual power light source and cross-sectional view of the dual power light device, in accordance with various embodiments of the present disclosure.

FIG. 3 shows a side view of a dual power light device 100 and cross-section A-A of the dual power light device 100. The cross-section A-A shows the internal components of the dual power light device 100. The cross-section A-A represents a top-to-bottom slice of the dual power light device 100, which passes through the head 303, body 304, and base cap 109. The cross-section A-A notably passes through the dual power selector 103, the charging port 203, and the power status indicators 118 and 121.

The dual power light device 100 can include a head 303. The head 303 can be a durable exterior component that contains a number of light source components. The head 303 can include one or more of metal, plastic, rubber, and other materials selected for durability. The head 303 can contain a light source housing 306.

The light source housing 306 can be a rigid interior component inside the head 303. The light source housing 306 can include one or more of metal, plastic, and other materials selected to provide a rigid housing for the light source 309, the exterior of the head 303, as well as a reflector 312, a lens 315, and a lens ring 318, among other components.

The light source 309 can include a light emitting diode (LED) light, an incandescent light bulb, a chip on board (COB) LED, or another type of light source, among the various embodiments. The light source 309 can be connected to a chip, circuit board or another light source circuit of the dual power light device 100. The light source circuit can connect to both power sources of the dual power light device 100, such that the light source 309 can be powered using either of the power sources.

The reflector 312 can include a parabolic, conic, or other type of reflector that provides a desired distribution of light from the light source 309 to the lens 315. The reflector can also provide an appropriate spacing between the light source 309 and the lens 315. The lens 315 can include a glass, polycarbonate, plastic, or other type of transparent or translucent material.

The lens 315 can provide a desired throw of light from the dual power light device 100. In some cases, the dual power light device 100 can enable a lens adjustment or beam adjustment by pulling, twisting or otherwise manipulating the head 303, the body 304, the base cap 109, or another beam adjustment button or slider component. The beam adjustment can move the lens 315 towards and away from the light source 309, the light source 309 towards and away from the lens 315. This can cause the light beam from the dual power light device 100 to become wider and more distributed, or narrower and more concentrated.

The lens ring 318 can hold the lens 315 in the head 303. The head 303 can include a ridge or another component that can hold the lens ring 318 against the lens 315. Alternatively, the lens ring 318 can be held by a friction fit, physical fasteners such as screws, or a chemical fastener such as glue or epoxy.

The dual power light device 100 can also include a chip, circuit board, or another primary circuit component 320, which can also be referred to as a switching circuit. The primary circuit component 320 can include power switches 321 and 324 corresponding to the power selection components 112 and 115, respectively. The dual power light device 100 can also include an electronics housing or other housing 333 within the body 304. The housing 333 can hold the primary circuit component 320, the switches, and other components shown within the body 304 of the dual power light device 100.

The "rechargeable power" switch 321 can be used in connection with the rechargeable power selection component 112. When a user depresses, slides or otherwise manipulates the rechargeable power selection component 112, the rechargeable power switch 321 can provide a switching action to the primary circuit component 320 to enable or switch power to rechargeable power source 348 if the dual power light device 100 is off, or if a replaceable power source 351 is currently being used. If the rechargeable power source 348 is in use, further depressing or manipulating the rechargeable power selection component 112 can cause the rechargeable power switch 321 to change a lighting mode of the dual power light device 100 and/or turn off the dual power light device 100. A switching device of the dual power light device 100 can include one or more power selection components or buttons as well as one or more electrical switch components.

The "alkaline or replaceable power" switch 324 can be used in connection with the replaceable power selection component 115. When a user depresses, slides or otherwise manipulates the replaceable power selection component 115, the replaceable power switch 324 can provide a switching action to the primary circuit component 320 to enable or switch power to the replaceable power source 351 if the dual power light device 100 is off, or if a rechargeable power source 348 is currently being used. If the replaceable power source 351 is in use, further depressing or manipulating the replaceable power selection component 115 can cause the replaceable power switch 324 to change a lighting mode of the dual power light device 100 and/or turn off the dual power light device 100.

The rechargeable power source 348 and the replaceable power source 351 can be detachably connected to the primary circuit component 320 using pogo pins or another type of contacts 352. While one of the contacts 352 is shown, others can be in line or otherwise on another plane or cross section. There can be three or more contacts 352, including one (or more) negative or ground connection, and two power connections with one for each of the rechargeable power source 348 and the replaceable power source 351. While the three or more contacts 352 can be on the top of the dual power source cartridge 355 to reduce wiring in the body 304, other embodiments can include contacts 352 on the bottom of the dual power source cartridge 355, with wiring, traces, or other electronic circuit connections to the primary circuit component 320 in the body 304.

Notably, the dual power source cartridge 355 can be designed to align within the body 304 of the dual power light device 100 such that it is limited to a single desired alignment. This alignment feature can prevent non-rechargeable (or replaceable) batteries from being inadvertently charged when an external power source is connected to the charging port 203. This and other safety mechanisms can also prevent the user from shorting the two different power sources of the dual power source cartridge 355. The alignment feature of the dual power source cartridge 355 is discussed further with respect to FIGS. 4-6.

The charging port 203 can connect to the primary circuit component 320, which provides a connection to the rechargeable power source 348 through the appropriate subset of contacts 352. The charging port 203 can alternatively connect to a charging circuit 336 that connects to the contacts 352 or another set of contacts of the rechargeable power source 348. The charging port 203 can include a standardized or proprietary power connector. Standardized power connectors can include barrel plug connectors, universal serial bus (USB) type connectors, and others.

USB connectors can include USB-A, USB-B, USB-C, Mini USB-A, Mini USB-B, Micro USB-A, Micro USB-B, and others. While the charging port 203 can be located on the body of the dual power light device 100, it can alternatively be located on the side of the base cap 109, or on the bottom of the dual power light device 100 opposite from the lens 315 and light source 309.

Figure 4:
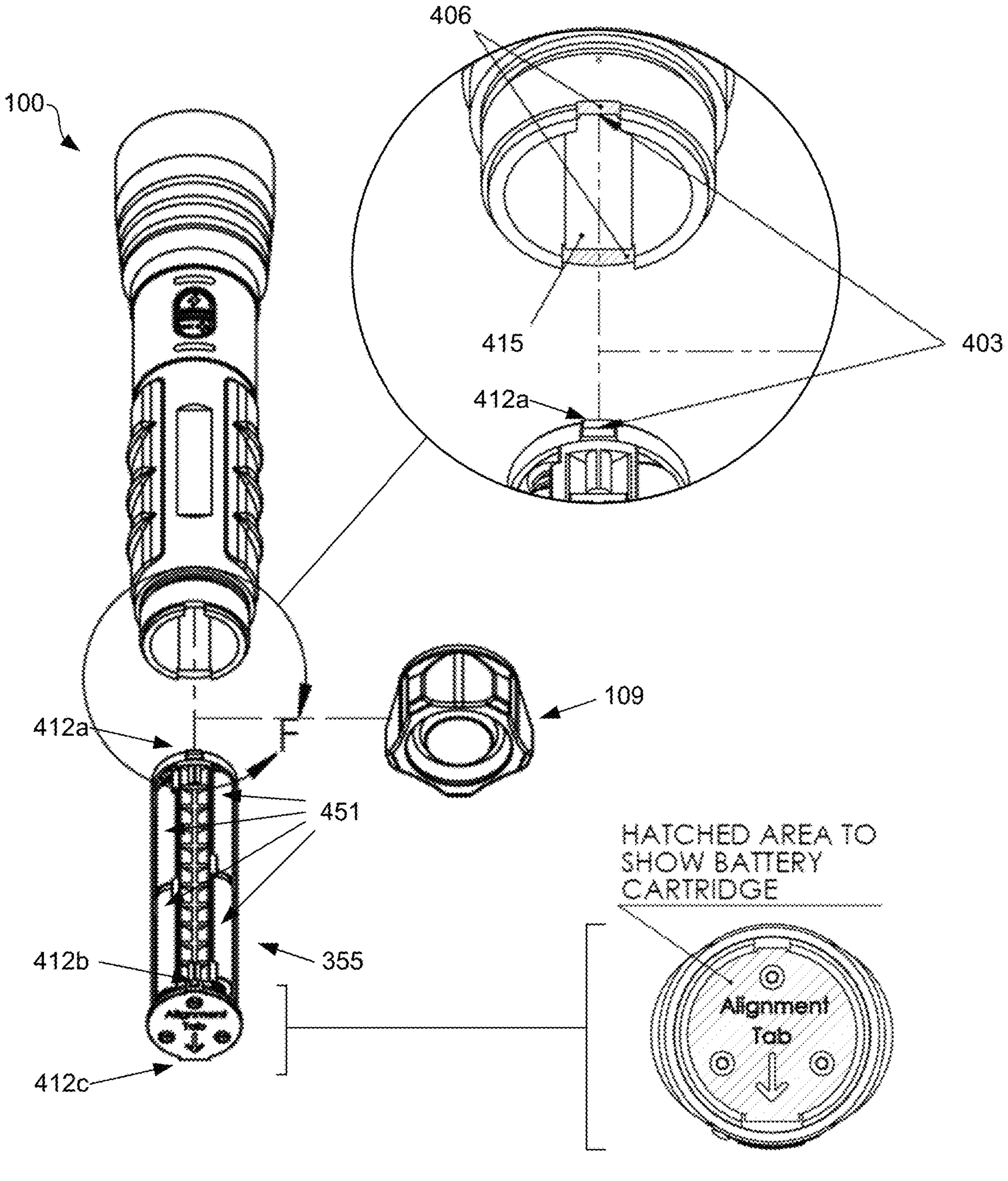
FIG. 4 is a drawing that includes a bottom perspective view of a dual power light device and its dual power source cartridge, as well as detail views, in accordance with various embodiments of the present disclosure.

FIG. 4 shows a bottom perspective view of a dual power light device 100 and its dual power source cartridge 355, as well as detail views. In this view, the base cap 109 is removed from the bottom of the body 304. The dual power source cartridge 355 is removed from within the body 304. FIG. 4 includes a detailed view of an alignment system 403.

The alignment system 403 can include one or more alignment notches 406 that are matched with a corresponding one or more alignment tabs 412 (including the alignment tabs 412*a*-412*c*), as well as one or more alignment rails 415. Alignment tabs 412 and alignment rails 415 can be considered alignment components of a housing or a body of the dual power light device 100.

The alignment notches 406 can include notches in a bottom side of the body 304, or a bottom side of an insert within the body 304. The bottommost surface of the body 304 or insert can be a circular, n-gonal (polygonal with n-sides), or another shape with the alignment notches 406 cutout from that surface. The alignment notches 406 can allow the dual power source cartridge 355 to be fully inserted into the body 304 in a single orientation, and can prevent the dual power source cartridge 355 from being fully inserted into the body 304 in any other orientation. The alignment system 403 can thereby prevent the power contacts of the dual power source cartridge 355 from touching corresponding contacts unless the dual power source cartridge 355 is properly aligned. This can ensure that the non-rechargeable batteries are not inadvertently charged, and can enforce all power contacts of the dual power source cartridge 355 to align properly with corresponding power contacts within the dual power light device 100.

In this example, there are two alignment notches 406, but any number of alignment notches 406 can be used. The two alignment notches 406 can be of different sizes. The different sized notches can prevent improper orientations since the larger one of the alignment tabs 412 cannot fit into the smaller one of the alignment notches 406.

The alignment tabs 412 can be present on one or both ends of the dual power source cartridge 355. In the example shown, the alignment tabs 412 include two alignment tabs 412*a* and 412*b* on a replaceable, alkaline, or non-rechargeable side of the dual power source cartridge 355. The alignment tabs 412 can also include two alignment tabs on a rechargeable side of the dual power source cartridge 355, but only the alignment tab 412*c* can be seen from the angle shown. When alignment tabs 412 are present on both ends of the dual power source cartridge 355, the alignment rails 415 can be used. The alignment tab 412*a* can be at a top-end or inserted-end of the dual power source cartridge 355. The alignment tabs 412*b* and 412*c* can be at a bottom-end or outer-end of the dual power source cartridge 355. In some examples, top-end alignment tabs 412 can be smaller than bottom-end alignment tabs 412. The alignment rails 415 can be sized to accept or fit at least a size and shape of the top-end or inserted-end alignment tabs 412.

In some examples, the alignment rails 415 can be too small to accept the bottom-end alignment tabs 412. This can prevent reverse-insertion of the dual power source cartridge 355. However, the alignment notches 406 can be sized to accommodate the bottom-end alignment tabs 412. Some embodiments can omit the alignment rail or rails 415. In such examples, the alignment tabs 412 can be present on the bottom end of the dual power source cartridge 355, and can be omitted or absent from the top end. While some alignment tabs 412 can be referred to as non-rechargeable side and rechargeable-side alignment tabs 412 for convenience, the alignment tabs 412 can be located at any orientation on the dual power source cartridge 355.

While the top-end or alignment tab 412*a* that is inserted into the alignment rail 415 is shown aligned with the bottom-end alignment tab 412*b*, other embodiments can have bottom-end alignment tabs 412 that are offset from the top-end alignment tabs 412. In such an example, the alignment notches 406 can be offset from the alignment rail 415, to accommodate the offset bottom-end alignment tabs 412.

The dual power source cartridge 355 is shown with its non-rechargeable, alkaline, or replaceable side facing. From this view, it can be seen that the non-rechargeable, alkaline, or replaceable batteries can be inserted into corresponding open slots in the dual power source cartridge 355. While not shown, the rechargeable batteries of the dual power source cartridge 355 can be covered with an unremovable cover so that the rechargeable batteries are embedded or sealed within. In some examples, a removable cover can be used to seal the rechargeable batteries into the dual power source cartridge 355. An unremovable cover can refer to a cover that is glued in place, held in place using a separate physical fastener, or is held in place with an integrated fastener such as a clip that is hidden once in place.

In some examples, the dual power source cartridge 355 can include a solid plastic housing into which the rechargeable batteries are inserted during assembly of the dual power source cartridge 355. Once assembly is complete, there may be no way to remove the embedded rechargeable batteries without destruction or disassembly of the dual power source cartridge 355. In any case, sealing or embedding the rechargeable batteries can prevent inadvertent removal of the rechargeable battery or batteries when the alkaline or other non-rechargeable batteries are being replaced by a user.

Figure 5:
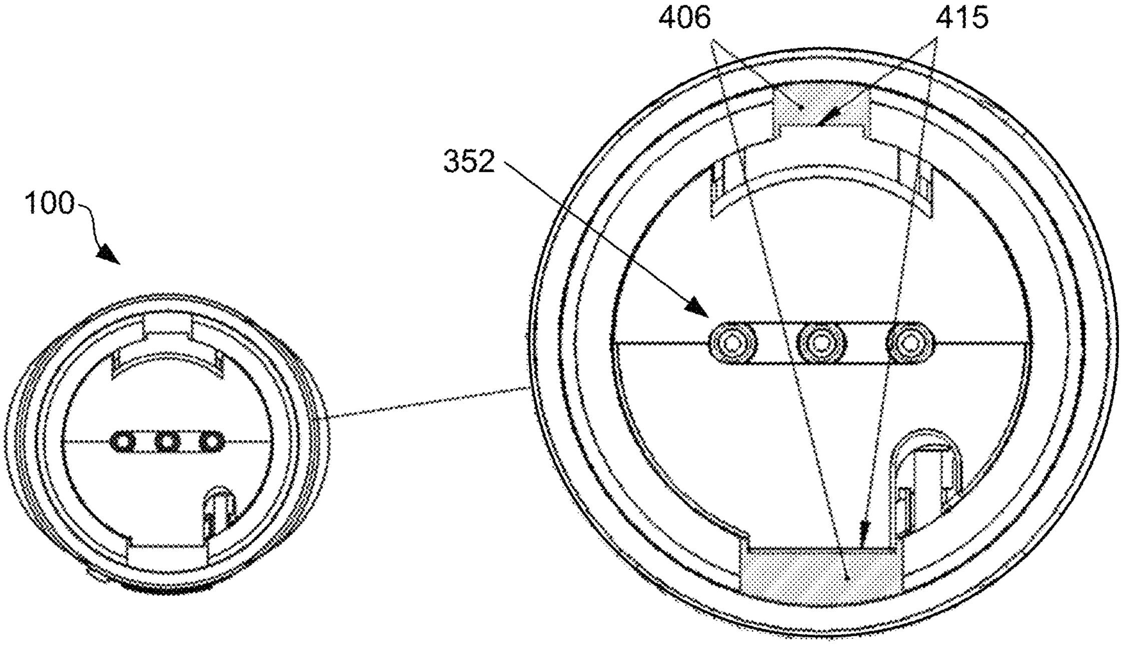
FIG. 5 is a drawing that includes a bottom view of a dual power light device with its base removed, in accordance with various embodiments of the present disclosure.

FIG. 5 is a drawing that includes a bottom view of a dual power light device 100 with its base cap 109 removed. This view shows a set of three contacts 352. In other examples, another number of contacts 352 can be used, such as four contacts 352. The set of three contacts 352 can include a negative or ground connection, and two power connections, with one for the rechargeable power source 348 and one for the replaceable power source 351.

While the contacts 352 are aligned in a linear shape in this example, the contacts 352 can alternatively form a triangular shape if there are three contacts, or a rectangular or another four-sided shape if there are four contacts. In any case, the alignment notches 406 and alignment rails 415 can ensure that the dual power source cartridge 355 (not shown) can only be inserted so that the rechargeable power contact 352 of the dual power light device 100 mates with the rechargeable power contact of the dual power source cartridge 355, and the non-rechargeable power contact 352 of the dual power light device 100 mates with the non-rechargeable power contact of the dual power source cartridge 355.

Figure 6:
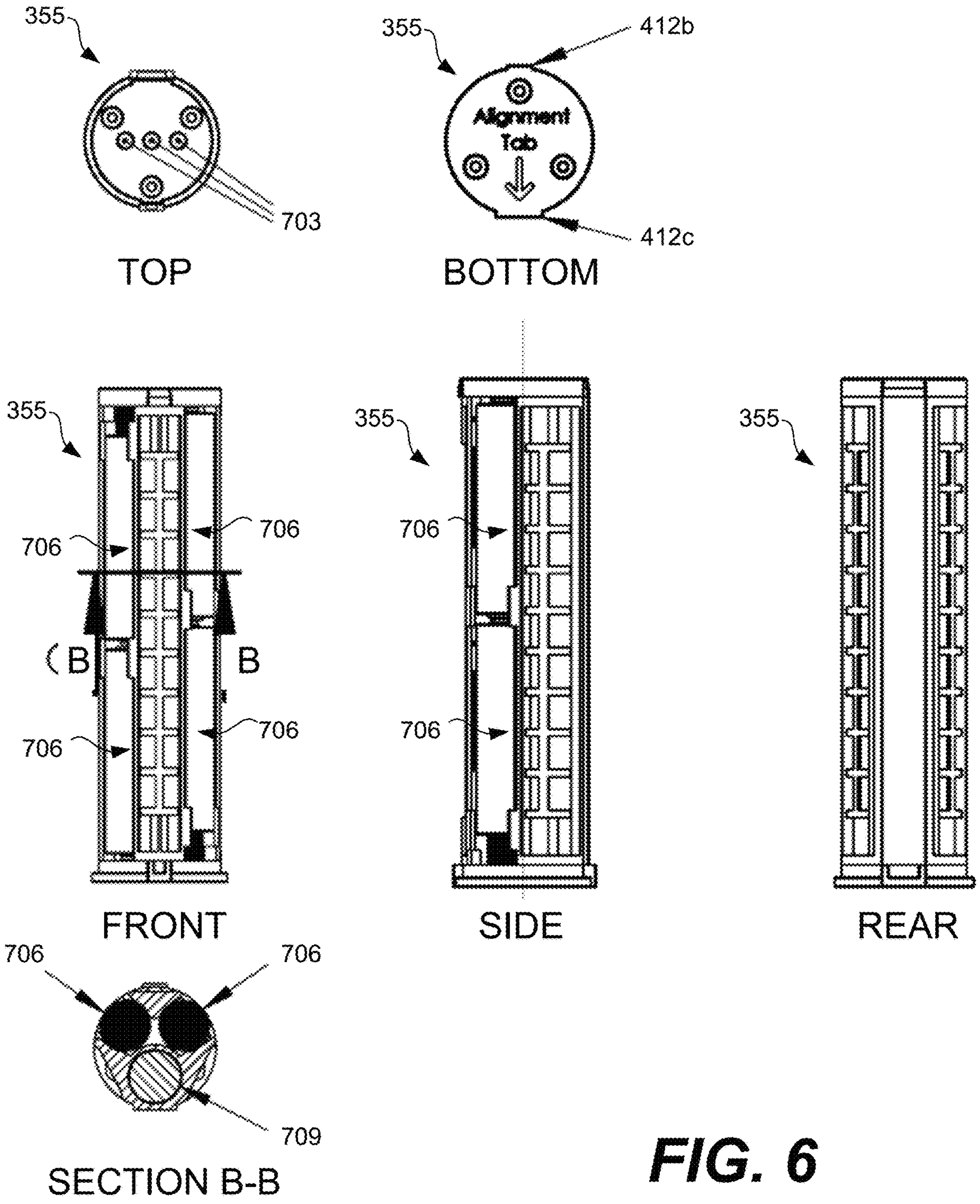
FIG. 6 is a drawing that includes various views of the dual power device cartridge of a dual power light device, in accordance with various embodiments of the present disclosure.

FIG. 6 shows various views of the dual power source cartridge 355 of a dual power light device 100. The views include a top view, a bottom view, a front view, a side view, a rear view, and a cross-sectional view.

From the top view, a set of cartridge contacts 703 of the dual power source cartridge 355 are shown. The cartridge contacts 703 can be arranged to match the contacts 352 of the dual power light device 100. While the cartridge contacts 703 are in a linear shape in this example, the cartridge contacts 703 can alternatively form a triangular shape if there are three cartridge contacts 703, or a rectangular or another four-sided shape if there are four cartridge contacts 703. In any case, the cartridge contacts 703 can match and mate with the contacts 352 of the dual power light device 100.

From the bottom view of the dual power source cartridge 355, the bottom-side alignment tabs 412*b* and 412*c* are shown. The bottom-side alignment tabs 412 can align with and fit into the alignment notches 406 of the dual power light device 100. The bottom-side alignment tabs 412 can, in some examples, also align with and fit into the alignment rails 415 of the dual power light device 100.

From the front view of the dual power source cartridge 355, the non-rechargeable, replaceable, or alkaline batteries 706 are shown. The batteries 706 can be inserted into the open-faced battery slots of the dual power source cartridge 355. The front view of the dual power source cartridge 355 also shows the line where the cross-sectional view B-B is taken.

From the cross-sectional view B-B of the dual power source cartridge 355, the non-rechargeable, replaceable, or alkaline batteries 706 are shown in black, and the rechargeable battery or batteries 709 are shown with cross hatching. As can be seen from this view, the batteries 706 are inserted into the open-faced battery slots. The batteries 706 can be easily removed from these open-faced battery slots. A user can quickly identify that the batteries 706 are available and easily removable, while the rechargeable battery or batteries 709 are sealed within the dual power source cartridge 355. Since the rechargeable battery or batteries 709 are sealed or embedded within the dual power source cartridge 355, or sealed or embedded within the dual power light device 100 housing or body, they can be considered non-replaceable, even if the cartridge is removable.

Even if there is a removable face plate that can be removed in order to service the rechargeable battery or batteries 709, the rechargeable battery or batteries 709 are sealed within the dual power source cartridge 355 and are more difficult to remove. This can prevent inadvertent removal of the rechargeable battery or batteries 709, when the non-rechargeable, replaceable, or alkaline batteries 706 are ready to be replaced.

From the side view of the dual power source cartridge 355, the non-rechargeable, replaceable, or alkaline batteries 706 are shown on the left side of the image, and a housing or cover is shown encasing the area where the rechargeable battery or batteries 709 are located. As can be seen from this view, the batteries 706 are inserted into the open-faced battery slots. The batteries 706 can be easily removed from these open-faced battery slots. A user can quickly identify that the batteries 706 are available and easily removable, while the rechargeable battery or batteries 709 are sealed within the dual power source cartridge 355.

From the rear view of the dual power source cartridge 355, a housing or cover is shown encasing the area where the rechargeable battery or batteries 709 are located. The housing or cover can prevent inadvertent removal of the rechargeable battery or batteries 709 when the non-rechargeable, replaceable, or alkaline batteries 706 are ready to be replaced.

Although relative terms are used in this specification, such as "up" and "down" to describe the relative relationship between one component and another component of an icon, these terms are used in this specification for convenience only, for example according to the directions of the examples described in the drawings. It can be understood that if the device is turned upside down, the component described "up" will become the component "down." When a structure is "on" or "positioned on" another structure, it may mean that a structure is integrally formed on another structure, or that a structure is "directly" arranged on another structure, or that a structure is arranged "indirectly" on another structure through another structure.

The terms "a," "an," "the," and "said" are used to indicate that there are one or more elements, components, etc. The terms "comprising" and "having" are used to indicate open-ended inclusion, and refers to that, in addition to the listed elements, components, etc., there may be other elements, components, etc. The terms "first" and "second" are used only as labels, and are not intended to be a limitation on the number of objects. The term "substantially" can describe an approximate fit, value, direction, orientation, or other parameter within a predetermined tolerance such as 1%, 2%, 3%, 4%, 5%, or another predetermined tolerance.

It should be emphasized that the above-described embodiments of the present disclosure are merely possible examples of implementations set forth for a clear understanding of the principles of the disclosure. While a feature can be described in connection with a particular figure, the feature can also be combined with features of the other figures. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A dual-power source lighting device, comprising:

a light source;

a removable cartridge comprising:

a sealed first housing configured to contain a rechargeable battery;

a second housing configured to contain a user-replaceable non-rechargeable battery;

one or more alignment components configured to ensure proper insertion of the removable cartridge into a body of the dual-power source lighting device; and an output terminal configured to electrically connect to both the rechargeable battery and the user-replaceable non-rechargeable battery to provide power to the light source of the dual-power source lighting device; and a lighting device body comprising:

a housing configured to receive the removable cartridge;

a corresponding one or more alignment components within the housing and configured to engage with the one or more alignment components on the removable cartridge to ensure proper orientation of the removable cartridge within the housing; and a detachable base cap that provides user access to replace the user-replaceable non-rechargeable battery without removing the removable cartridge.

2. The dual-power source lighting device of claim 1, wherein the lighting device body further comprises a locking mechanism configured to secure the removable cartridge within the housing.

3. The dual-power source lighting device of claim 1, wherein the lighting device body further comprises a charging port integrated into the housing, the charging port configured to provide an electrical connection for charging the rechargeable battery when the removable cartridge is inserted.

4. The dual-power source lighting device of claim 3, wherein the charging port is positioned such that the rechargeable battery can be charged while the dual-power source lighting device is in use.

5. The dual-power source lighting device of claim 4, wherein the charging port includes an indicator light configured to display a charging status of the rechargeable battery.

6. The dual-power source lighting device of claim 1, wherein the corresponding one or more alignment components of the lighting device body comprise one or more alignment tabs and the one or more alignment components of the removable cartridge comprise one or more alignment notches.

7. The dual-power source lighting device of claim 1, wherein the corresponding one or more alignment components of the lighting device body comprise one or more alignment notches and the one or more alignment components of the removable cartridge comprise one or more alignment tabs.

8. A body for a dual-power source lighting device, the body comprising:

a housing configured to receive a removable cartridge containing a first power source and a second power source that is different from the first power source, the second power source comprising a non-rechargeable battery;

one or more alignment components within the housing and configured to engage with one or more corresponding alignment components on the removable cartridge to ensure proper orientation of the removable cartridge within the housing; and a detachable base cap that provides user access to replace the second power source without removing the removable cartridge.

9. The body of claim 8, further comprising a locking mechanism configured to secure the removable cartridge within the housing.

10. The body of claim 8, further comprising a charging port integrated into the housing, the charging port configured to provide an electrical connection for charging the first power source when the removable cartridge is inserted.

11. The body of claim 10, wherein the charging port is positioned such that the first power source can be charged while the dual-power source lighting device is in use.

12. The body of claim 10, wherein the charging port includes an indicator light configured to display a charging status of the first power source.

13. The body of claim 8, wherein the one or more alignment components further comprise electrical contacts positioned to automatically engage corresponding terminals on the removable cartridge when the removable cartridge is properly aligned and inserted into the housing.

14. The body of claim 8, further comprising a sealing element positioned at an interface between the housing and the removable cartridge, the sealing element configured to provide a waterproof seal when the cartridge is fully inserted.

15. The body of claim 8, wherein the one or more alignment components comprise one or more alignment tabs that are matched with a corresponding one or more alignment notches of the removable cartridge.

16. The body of claim 8, wherein the one or more alignment components comprise one or more alignment notches that are matched with a corresponding one or more alignment tabs of the removable cartridge.

17. A dual-power source cartridge for use in a lighting device, the dual-power source cartridge comprising:

a sealed first housing configured to contain a rechargeable battery;

a second housing configured to contain a user-replaceable non-rechargeable battery;

one or more alignment components configured to ensure proper insertion of the dual-power source cartridge into a body of the lighting device, the body comprising a detachable base cap that provides user access to replace the user-replaceable non-rechargeable battery without removing the dual-power source cartridge; and an output terminal configured to electrically connect to both the rechargeable battery and the user-replaceable non-rechargeable battery to provide power to a light source of the lighting device.

18. The dual-power source cartridge of claim 17, wherein the one or more alignment components comprise one or more alignment tabs that are matched with a corresponding one or more alignment notches of the body of the lighting device.

19. The dual-power source cartridge of claim 17, wherein the one or more alignment components comprise one or more notches that are matched with a corresponding one or more alignment tabs of the body of the lighting device.

* * * * *